(12) United States Patent
Lyons

(10) Patent No.: US 11,686,279 B1
(45) Date of Patent: Jun. 27, 2023

(54) CONTROLLING VEHICLE EXHAUST

(71) Applicant: International Engine Intellectual Property Company, LLC, Lisle, IL (US)

(72) Inventor: Timothy M. Lyons, Batavia, IL (US)

(73) Assignee: International Engine Intellectual Property Company, LLC, Lisle, IL (US)

( * ) Notice: Subject to any disclaimer, the term of this patent is extended or adjusted under 35 U.S.C. 154(b) by 0 days.

(21) Appl. No.: 17/897,954

(22) Filed: Aug. 29, 2022

(51) Int. Cl.
*F02M 35/02* (2006.01)
*B60H 1/24* (2006.01)
*F02M 35/10* (2006.01)

(52) U.S. Cl.
CPC ......... *F02M 35/0201* (2013.01); *B60H 1/248* (2013.01); *F02M 35/10078* (2013.01); *F02M 35/10255* (2013.01)

(58) Field of Classification Search
CPC ....... F02M 35/02021; F02M 35/10078; F02M 35/10255; F02M 35/108; B60H 1/248; B60H 1/247; F01N 3/05; F01N 13/08; F01N 13/082; F01N 13/20
See application file for complete search history.

(56) References Cited

U.S. PATENT DOCUMENTS

| | | | | |
|---|---|---|---|---|
| 6,564,768 B2 * | 5/2003 | Bauer | ................. | F02M 35/024 |
| | | | | 55/385.3 |
| 10,514,007 B2 * | 12/2019 | McCann | .............. | F02M 35/161 |
| 2010/0083928 A1 * | 4/2010 | Saito | ..................... | F02B 27/005 |
| | | | | 123/184.56 |
| 2014/0090373 A1 * | 4/2014 | Timmons | .............. | F02D 23/005 |
| | | | | 123/559.3 |

* cited by examiner

*Primary Examiner* — Syed O Hasan
(74) *Attorney, Agent, or Firm* — Mark C. Bach

(57) ABSTRACT

An air intake system for a vehicle comprises an exterior air inlet disposed on the vehicle that receives air from an exterior of the vehicle. An air outlet is disposed on the vehicle that supplies air to an engine of the vehicle. A conduit network connects the exterior air inlet and the air outlet. An interior air device disposed on the vehicle is connected to the conduit network allowing air from an interior of the vehicle into the engine. A base plate with an opening is attached to the conduit network. A hatch connected the base plate allows air from the interior of the vehicle through the opening.

1 Claim, 5 Drawing Sheets

CONTROLLING VEHICLE EXHAUST

FIELD

The present disclosure generally relates to a vehicle component and operation of vehicle component. More particularly, embodiments described relate to a system controlling vehicle exhaust, a device controlling vehicle exhaust and a method for controlling vehicle exhaust.

BACKGROUND

Various modifications have been made to some vehicle components to enhance their efficiency and efficiency of associated vehicles. While solving certain problems, some design modifications of vehicle components may present challenges. For instance, under certain ambient conditions, it may be difficult to obtain certain operating temperatures for vehicle components, like an aftertreatment system on a vehicle. An aftertreatment system reduces harmful emissions and particulates from exhaust gas of a diesel engine. In some applications, exhaust gas may be used to control temperature of components in the aftertreatment system and effectively operate the aftertreatment system. For example, in some vehicle operating modes like stationary regeneration, an increased exhaust gas temperature may help promote efficient regeneration of the aftertreatment system. But as engine efficiency increases, controlling temperature of the aftertreatment system using exhaust gas becomes difficult. Hence, there is a need for improved approaches to controlling temperature of the aftertreatment systems.

SUMMARY

A system, device, and method for controlling exhaust on a vehicle are provided. In one embodiment, an air intake system for a vehicle comprises an exterior air inlet disposed on the vehicle that receives air from an exterior of the vehicle. An air outlet is disposed on the vehicle that supplies air to an engine of the vehicle. A conduit network connects the exterior air inlet and the air outlet. An interior air device disposed on the vehicle is connected to the conduit network allowing air from an interior of the vehicle into the engine. A base plate with an opening is attached to the conduit network. A hatch connected the base plate allows air from the interior of the vehicle through the opening.

DETAILED DESCRIPTION

To operate, a vehicle powered by a diesel engine may rely on management of engine exhaust temperature. Appropriate engine exhaust temperature provides appropriate vehicle operation and engine performance. Yet, certain operating modes and ambient conditions can make management of engine exhaust temperature challenging. Embodiments described herein allow a vehicle to operate under a variety of ambient conditions and operating modes. Some embodiments described herein allow for evacuation of an odor, like an odor from under a hood area of the vehicle and the like, from the vehicle.

Figure 1:
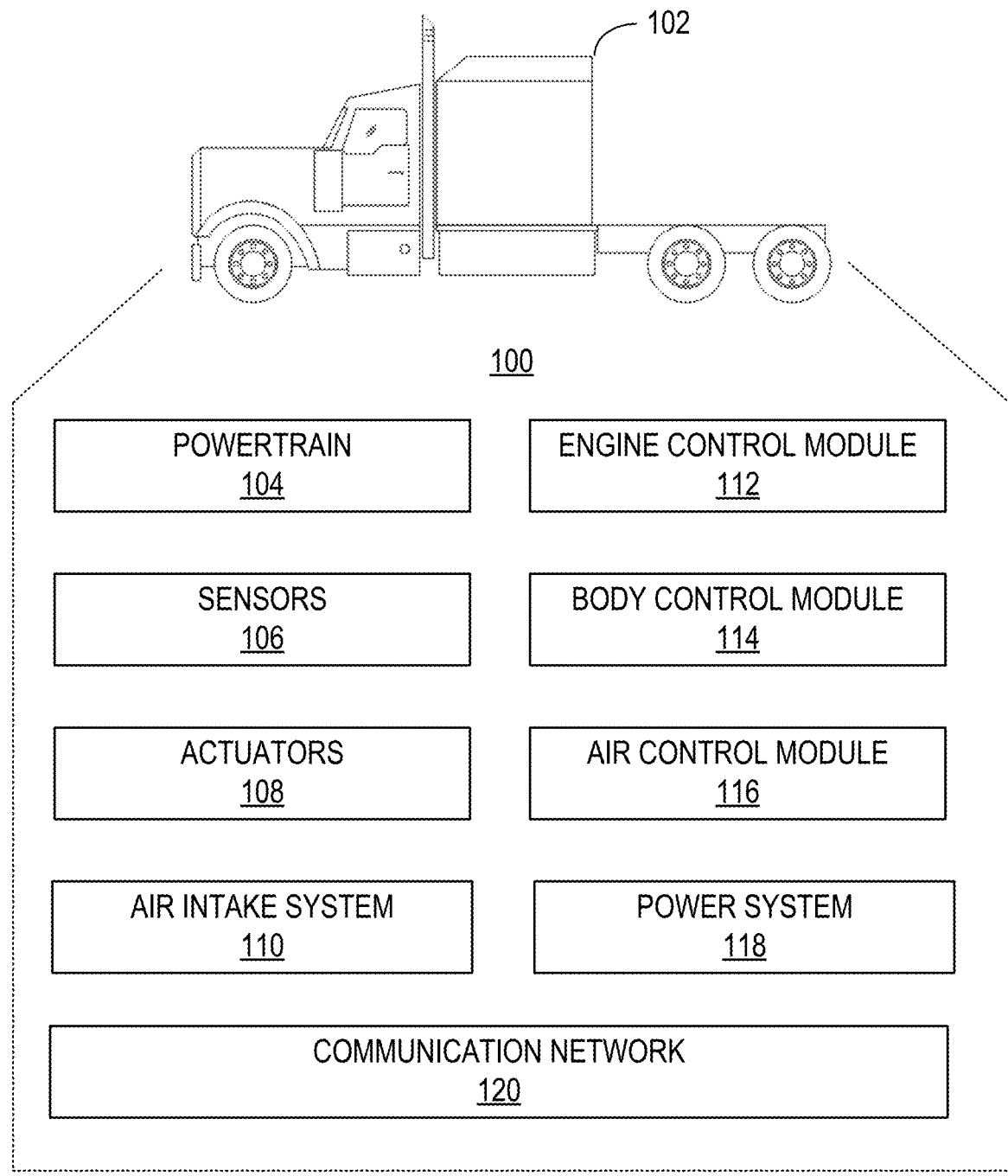
FIG. 1 is a diagram showing an example system, as described herein.

FIG. 1 illustrates a system 100 in accordance with aspects of the present disclosure. The system 100 may be part of or incorporated into a vehicle 102. The vehicle 102 may include various types of automobiles, trucks, trailer tractors, utility vehicles, sport utility vehicles (SUVs), recreational vehicles (RVs), and the like as well as various types of boats, planes, drones, trains, and other machines and so forth. In some embodiments, as shown in FIG. 1, the system 100 may include a vehicle powertrain 104, sensors 106, actuators 108, and an air intake system 110.

The powertrain 104 may include a variety of components, including an engine, transmission, driveshaft, axle, differential and so forth, that together create power and deliver power to wheels of the vehicle 102 to propel the vehicle 102. In some applications, the vehicle 102 is powered by an internal combustion engine. In other applications, the vehicle 102 is powered by electric power provided by one or more electric motors. In yet other applications, the vehicle 102 is powered by a combination of electric and combustion power.

The sensors 106 of the system 100 may include a variety of sensors and sensing devices that may provide various useful signals and information about vehicle 102 operation and environment in which the vehicle 102 operates. As non-limiting examples, the sensors 106 may include current sensors, voltage sensors, mass sensors, fuel sensors, temperature sensors, flow sensors, gas sensors, coolant sensors, sparkplug sensors, coolant sensors, throttle sensors, speed sensors, cameras, and so forth.

The actuators 108 of the system 100 may perform a multitude of tasks including regulating fluid flow, moving components, controlling valves, activating switches, operating gears, and so forth, on the vehicle 102. The actuators 108 may operate by hydraulic, pneumatic, magnetic, mechanical, thermal or electrical activation or movement of components. In some embodiments, one or more actuators 108 may be used to operate an interior air device or air inlet device disposed on the vehicle 102 on the air intake system 110 that selectively allows air from an interior of the vehicle 102, like the space under the hood, into a vehicle 102 engine.

The air intake system 110 may include a number of components and component assemblies that together operate to monitor, control and direct air to the engine of the vehicle 102. For example, the air intake system 110 may include various inlets, outlets, filters, turbochargers, compressors, charge coolers, intercoolers, and so forth, as well as various valves, throttles, tubing, conduits, couplings, sensors, meters, shields, brackets, and other components and accessories. The air intake system 110 may include an exterior air inlet disposed on the vehicle 102 that receives air from an exterior of the vehicle 102, an air outlet disposed on the vehicle 102 that supplies air to the vehicle 102 engine, and a conduit network that connects the various components of the air intake system 110. In some embodiments, the air intake system 110 may also include an interior air device that connects to the conduit network and is operable to selectively allow air from an interior of the vehicle 102 into the engine.

Referring again to FIG. 1, the system 100 may also include a number of control modules that are configured to perform, manage and monitor various functions of the vehicle 102. In some embodiments, the system 100 may include an engine control module 112, a body control module 114, an air control module 116, and a power system 118, as shown in FIG. 1, at least one of which is disposed on the vehicle 102.

The engine control module (ECM) 112 may monitor and control various parameters and functions of the vehicle 102 engine, including air-fuel ratio, idle speed, valve timing, ignition timing, crankshaft position, and so forth. To perform such functions, the ECM 112 may include any combination of analog and/or digital inputs and outputs, microprocessors, integrated circuitry, memories, clocks, Application Programming Interfaces (APIs), firmware, software, and so forth, and may communicate with various components on the vehicle 102. For example, in some implementations, the ECM 112 may communicate with sensors 106 and components of the vehicle 102 engine, sensors 106 and components on the vehicle 102 exhaust system, and so forth.

The body control module (BCM) 114 may monitor and control various vehicle body, security and convenience functions. For instance, the BCM 114 may manage exterior lighting, interior lighting, vehicle 102 locking, remote entry, remote start, windshield wipers, seat adjustment, tire pressure monitoring, and so forth. To perform such functions, the BCM 114 may include any combination of analog and/or digital inputs and outputs, microprocessors, integrated circuitry, programmable circuitry, clocks, APIs, and so forth, and may communicate with, monitor, and control various sensors 106, actuators 108, and other components on the vehicle 102.

The air control module (ACM) 116 may monitor and control various functions and components associated with the air intake system 110. For instance, in some embodiments, the ACM 116 may control exhaust on the vehicle 102 by operating, at least in part, an interior air device that selectively allows air from an interior of the vehicle 102 into air intake system 110. In one embodiment, the ACM 116 may control air pressure received by an actuator arm of an interior air device. In other embodiments, the ACM 116 may use other components and control methods, including electric signals, optical signals, hydraulic pressure, and so forth, to operate the interior air device. To perform monitor and control functions, the ACM 116 may include any combination of analog and/or digital elements and devices, microprocessors, integrated circuitry, programmable circuitry, clocks, APIs, and so forth. In some embodiments, the ACM 116 may include a memory or a non-transitory computer-readable storage medium that stores and retrieves data, information, and executable instructions. The executable instructions may include, at least in part, executable instructions to control the exhaust of the vehicle 102, in accordance with the present disclosure.

The ACM 116 may include or communicate with a variety of other elements, components and hardware, including any combination of compressors, pumps, regulators, valves, sensors, ports, motors, and so forth. Components of the ACM 116 may be contained inside a single housing, or in multiple housings disposed on the vehicle 102. The ACM 116 may operate independently, but may also receive instructions from or cooperate with various external computers, systems, devices, and hardware. In some embodiments, the ACM 116 may communicate with the ECM 112 and coordinate operation of an interior air device and vehicle 102 engine.

Although specific examples of control modules are shown in FIG. 1 as being included in the system 100, the system 100 may include more or fewer control modules, and may integrate or separate different functionalities of monitoring or control of components on the vehicle 102. For instance, although FIG. 1 shows ECM 112 and ACM 116 as separate components, in some embodiments, functions of the ECM 112 and ACM 116 may be carried out by a single control module. Also, in some embodiments, the system 100 may include additional modules for brake control, climate control, transmission control, traction control, and so on. In other embodiments, the system 100 may include a powertrain control module that monitors and/or controls an ignition system, fuel injection, emission systems, mechanical positioning of a rotating assembly, exhaust system, transmission, and any other functions related to operation of the engine and transmission.

The power system 118 in FIG. 1 may provide power to various components of the vehicle 102. For example, the power system 118 may power the ACM 116, sensors 106, actuators 108, and other components of the vehicle 102. To provide and deliver power, the power system 118 may include a variety of hardware and components, including one or more batteries, solar panels, starters, alternators, relays, converters, controllers, regulators, switches, solenoids, electrical wiring, electrical circuitry, electrical elements, and so forth.

Components of the system 100 may be coupled or connected to one another system, and exchange signals, data, and information, by way of a communication network 120, as shown in FIG. 1. The communication network 120 may include a variety of hardware and components that provide wired as well as wireless connectivity. In some embodiments, the communication network 120 may include one or more vehicle buses that interconnect components and hardware in the system 120, and implement one or more communications protocols. Non-limiting example protocols include Control Area Network (CAN), Local Interconnect Network (LIN), Flex-Ray, Vehicle Area Network (VAN), Media Oriented System Transport (MOST), Ethernet, and so forth. The communications network 120 may also include various gateways, bridges, receivers, transmitters, transceivers, and other components and hardware facilitating communication.

Figure 2:
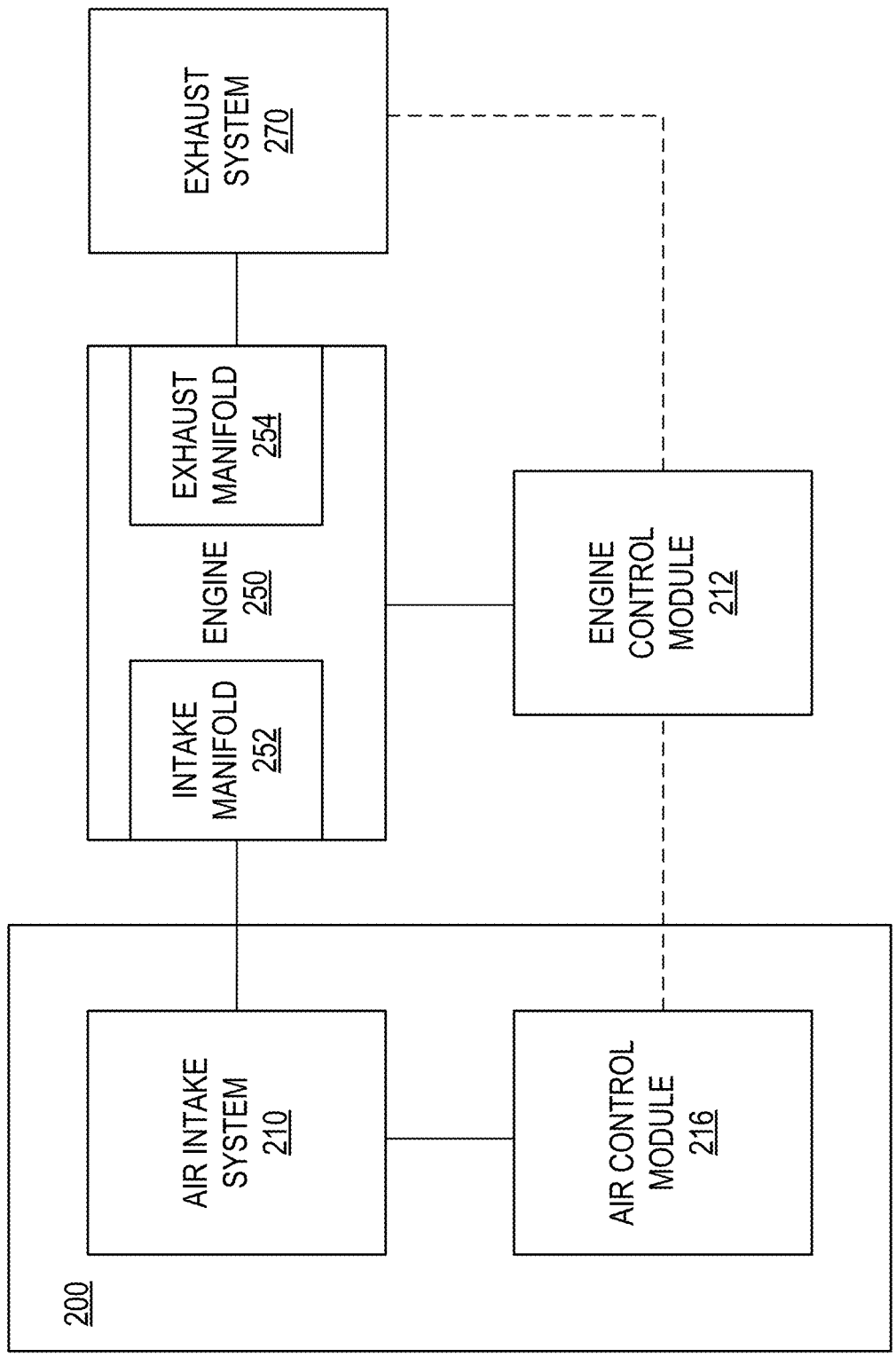
FIG. 2 is a diagram showing another example system, as described herein.

Turning now to FIG. 2, an example system 200, in accordance with aspects of the present disclosure, is illustrated. In general, the system 200 may include an air intake system 210 and an ACM 216 in communication with the air intake system 210. As described, the air intake system 210 may include a number of components and component assemblies that together may operate to monitor, control and direct air to an engine 250 on a vehicle 102. In some embodiments, the air intake system 210 may include an interior air device (not shown) that is operable to selectively allow air from an interior of the vehicle 102 into the engine 250. The ACM 116 may monitor and control various functions and components associated with the air intake system 210, as described with reference to FIG. 1. For instance, in some embodiments, the ACM 216 may control the exhaust on the vehicle 102 by operating, at least in part, the interior air device to selectively allow air from an interior of the vehicle 102 into the air intake system 210.

As shown in FIG. 2, the air intake system 210 may be in communication with and provide air to the engine 250 via an intake manifold 252 on the engine 250. The engine 250 may also be in communication with an ECM 212 that monitors and controls various parameters and functions of the engine 250, as described with reference to FIG. 1. Exhaust produced by the engine 250 may then be directed via an exhaust manifold 254 on the engine 250 to an exhaust system 270, as shown in FIG. 2.

The exhaust system 270 may perform various functions, including controlling noise from the engine 250, directing exhaust away from vehicle 102 occupants, as well as improving engine 250 performance and fuel consumption. To do so, the exhaust system 270 may include various components and assemblies, including pipes, resonators, mufflers, sensors, clamps, flanges, filters, tanks, pumps, and so forth. In some embodiments, the exhaust system 270 may include an aftertreatment system that reduces harmful emissions and particulates from the exhaust gas of the engine 250. To do so, the exhaust system 270 may include various components and materials. In some non-limiting examples, the exhaust system 270 may include various catalysts (e.g. diesel oxidizing catalyst, selective catalytic reduction catalyst, etc.), fluids (e.g. diesel exhaust fluid, etc.), filters (e.g. diesel particulate filter, etc.), and so forth.

The ECM 212 may be connected to and communicate with various components on the exhaust system 270, as shown in the embodiment of FIG. 2. For instance, the ECM 212 may be connected to sensors (not shown in FIG. 2) on the exhaust system 270. Non-limiting example sensors include sensors that indicate a presence or a level of gas or particulates in engine 250 exhaust (e.g. oxygen, carbon dioxide, carbon monoxide, oxides of nitrogen, hydrocarbons, sulfur dioxide, aldehydes, formaldehyde, acetaldehyde, acrolein, hydrocarbons, dust, dirt, etc.), sensors that indicate a temperature of one or more components on the exhaust system 270, sensors that indicate fluid levels, and other sensors that indicate various attributes related to exhaust gas.

In some embodiments, the ACM 216 may communicate with the ECM 212, as shown in FIG. 2, and coordinate operation of an interior air device and the engine 250. Although FIG. 2 shows ACM 216 and ECM 212 as two separate components, in some embodiments, functions of the ECM 212 and ACM 216 may be carried out by a single control module. For instance, in some embodiments, the ACM 216 and/or ECM 212 may determine and control a temperature of exhaust gas received by the exhaust system 270 by operating, at least in part, an interior air device to selectively allow air from an interior of the vehicle 102 into the air intake system 210. In one non-limiting example application, controlling temperature of the exhaust gas may be coordinated with a mode of operation of the vehicle 102, like regeneration of one or more components on the exhaust system 270, or operating the vehicle 102 in specific ambient conditions.

Figure 3:
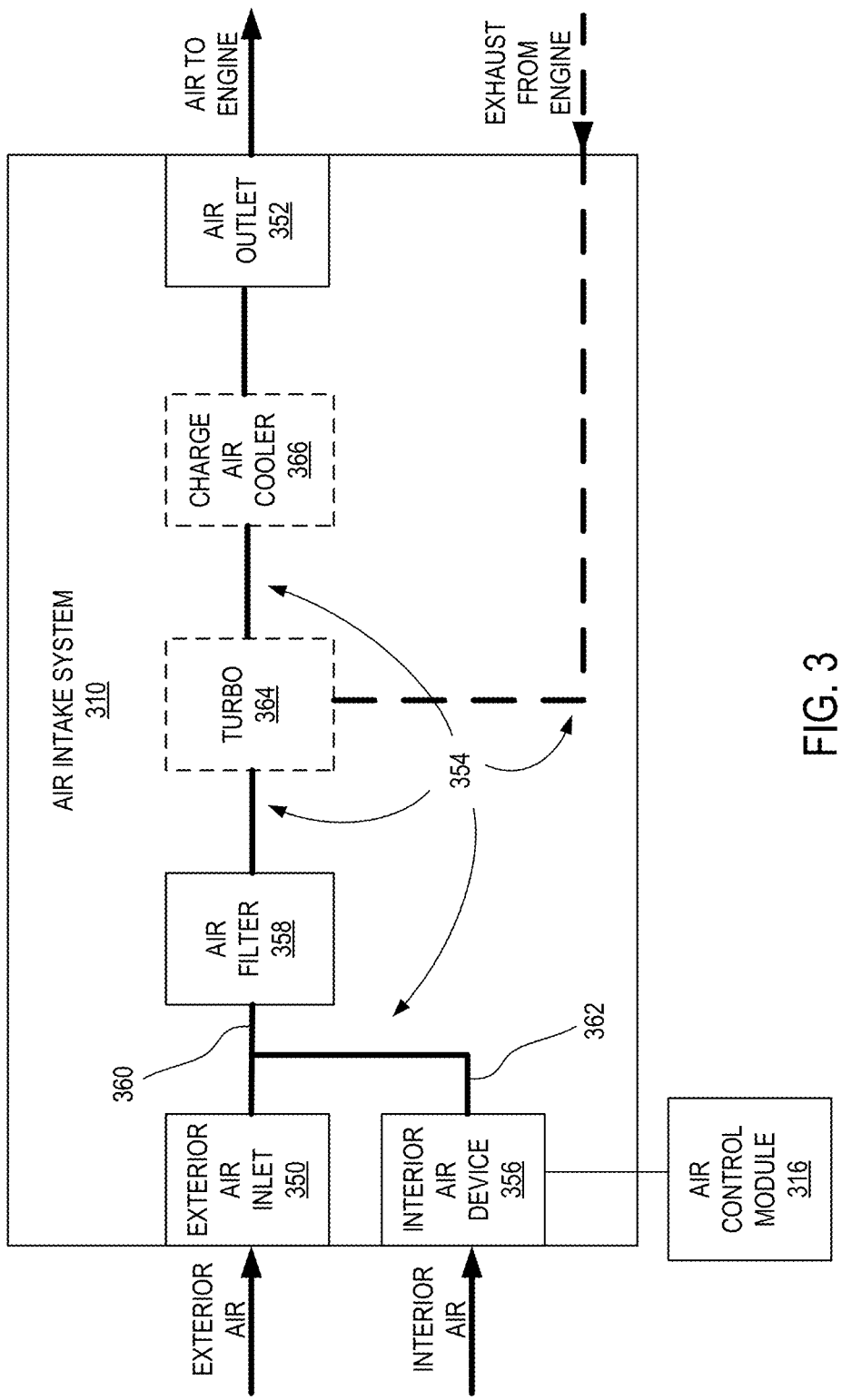
FIG. 3 is a diagram showing yet another example system, as described herein.

Turning now to FIG. 3, an example air intake system 310, in accordance with aspects of the present disclosure is shown. In general, the air intake system 310 may include an exterior air inlet 350 that receives air from an exterior of a vehicle 102, an air outlet 352 that supplies air to the engine of the vehicle 102, and a conduit network 354 that connects various elements on the air intake system 310. In some embodiments, the air intake system 310 may include an interior air device 356 that is connected to the conduit network 354 and is operable to selectively allow air from an interior of a vehicle 102 into the vehicle 102 engine. In some examples, the interior of the vehicle 102 includes a space under a hood of the vehicle.

In some embodiments, the air intake system 310 may also include an air filter 358 that is connected to the conduit network 354. As shown in FIG. 3, the air filter 358 may be connected to the exterior air inlet 350, and positioned along the conduit network 354 between the exterior air inlet 350 and the air outlet 352. In some embodiments, the air filter 358 may be connected by a first conduit 360, as shown in FIG. 3. The first conduit 360 may have any form, shape and size and may be suited for airflow.

Figure 4:
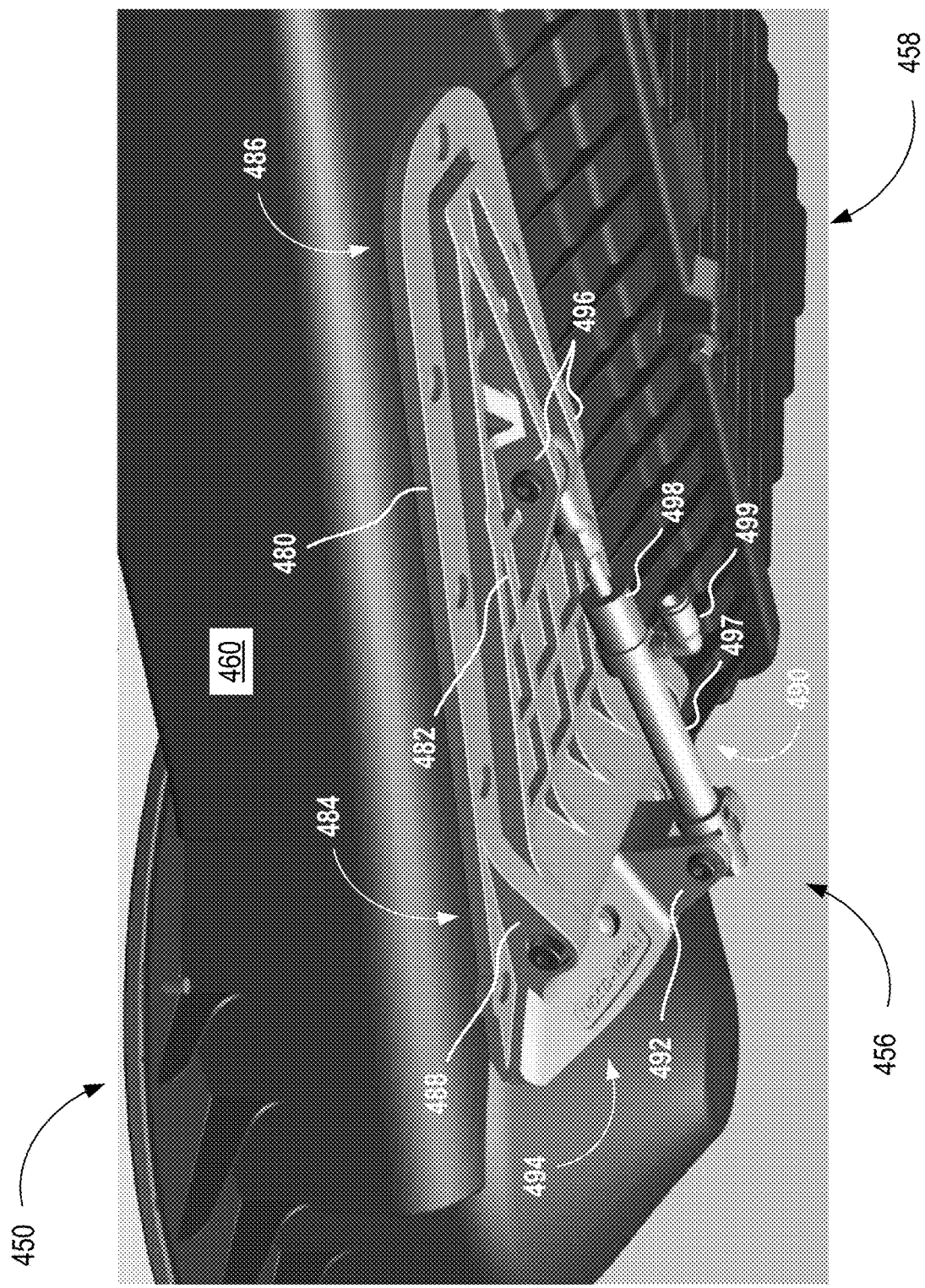
FIG. 4 is a diagram showing an example device, as described herein.

The interior air device 356 may include a variety of devices that can be controllably operated to allow air from the interior of the vehicle 102 to enter the vehicle 102 engine via the conduit network 354. One non-limiting example is shown in FIG. 4. Other examples include various valves, solenoids, doors, and so forth, that can be partially or completely opened, or closed to control interior air flowing into the conduit network 354. In some implementations, as shown in FIG. 3, the interior air device 356 may be connected to the conduit network 354 via a second conduit 362. The second conduit 362 may have any form, shape and size and may be suited for airflow. In some embodiments, the second conduit 362 connects to the first conduit 360 between the exterior air inlet 350 and the air filter 358. Alternatively, in some embodiments, the interior air device 356 may connect directly to the first conduit 360.

As shown in FIG. 3, the interior air device 356 may be connected to and controlled by an ACM 316, as described with reference to FIGS. 1 and 2. In some implementations, the ACM 316 may determine and control a temperature of exhaust gas received by an exhaust system. To do so, the ACM 316 may operate, at least in part, the interior air device 356 to selectively allow air from an interior of the vehicle 102 into the conduit network 354 of the air intake system 310. In one non-limiting example application, controlling the temperature of the exhaust may be coordinated by the ACM 316 with a mode of operation of the vehicle 102. Example modes of operation include regeneration of one or more components on the exhaust system 270, operating the vehicle 102 in specific ambient conditions, and others.

Although FIG. 3 shows specific components included in the air intake system 310, more or fewer components may be included. For instance, in some embodiments, the air intake system 310 may include a turbocharger 364, and a charge air cooler 366, which are positioned between the exterior air inlet 350 and the air outlet 352, connected to the conduit network 354 as shown in FIG. 3. Also, in some embodiments, in addition to receiving exterior air via the exterior air inlet 350 and interior air interior air device 356, the air intake system 310 may also receive exhaust air from the vehicle 102 engine. Furthermore, although the air intake system 310 and ACM 316 are shown in FIG. 3 as being separate, in some embodiments, the air intake system 310 and ACM 316 may be integrated into a single system.

Referring now to FIG. 4, a non-limiting example of an interior air device 456 is shown. The interior air device 456 may be connected to a conduit network 354 of an air intake system 310 of a vehicle 102, as described with reference to FIG. 3. In some embodiments, the interior air device 456 may be attached to a conduit 460 between an exterior air inlet 450 and an air filter 458, as shown in FIG. 4.

In general, the interior air device 456 may include a base plate 480, and a hatch 482 that connects to the base plate 482. The base plate 480 and hatch 428 may have various shapes, sizes and configurations. In some embodiments, as shown in FIG. 4, the base plate 480 may extend from a first end 484 to a second end 486, and includes an opening (not shown in FIG. 4) disposed on the base plate 480. In some embodiments, the hatch 480 may be connected to the base plate 482 at the first end 484 using two anchor tabs 488 that extend from the base plate 480. The anchor tabs 488 may fix position of the hatch 480 at the first end 484 of the base plate 480, as shown in FIG. 4. When operated, the hatch 482 may pivot about an axis defined by the anchor tabs 488, and move away from the base plate 480 to expose the opening in the base plate 480. In this manner, the opening in the base plate 480 can be covered and uncovered using the hatch 482 to selectively allow air from an interior of the vehicle 102 through the opening in the base plate 480.

In some implementations, movement of the hatch 482 may be controlled by an actuator arm 490 that attaches to the base plate 480 and hatch 482. One example actuator arm 490 is shown in FIG. 4. At one end, the actuator arm 490 may attach to a raised joint 492 that extends from the base plate 480 at the first end 484. As shown in FIG. 4, the raised joint 492 may extend from an angled portion 494 of the base plate 480 that is angled away from a plane defined by the first end 484 and the second end 486. At another end, the actuator arm 490 may attach to fixation panels 496 that extend from the hatch 482.

In some embodiments, the actuator arm 490 may include a cylinder 497 and piston 498 that are movably coupled to one another, as shown in FIG. 4. That is, the piston 498 can extend from and retract into cylinder 497. The actuator arm 490 may also include an inlet port 499 that connects to the cylinder 497. When air pressure is controlled via the inlet port 499, the piston 498 moves inward or extends outward from the cylinder 497, which in turns controls an extension of the actuator arm 490. A complete extension of the actuator arm 490 presses the hatch 482 against the base plate 480, and cuts off air flow through the interior air device 456. By contrast, an incomplete extension keeps the hatch 482 open, and allows air to flow through the interior air device 456. In some embodiments, air pressure provided to the actuator arm 490 may be controlled by an air control module, as described with reference to FIGS. 1-3. Although the movement of the hatch 482 may be controlled by an actuator arm 490, as described above, the hatch 482 may be operated using a variety of methods and components to selectively control air into the conduit 460 through the opening in the base plate 480.

Figure 5:
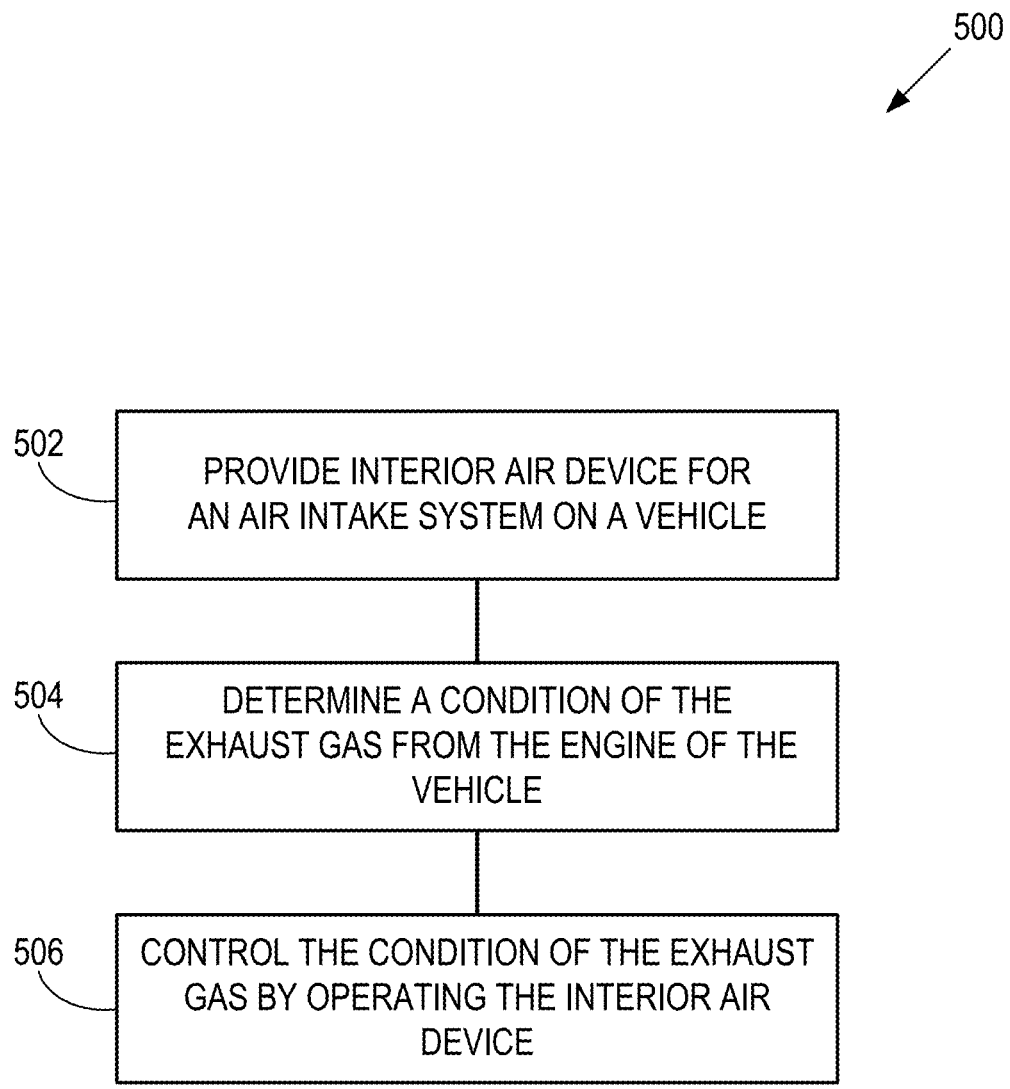
FIG. 5 is a flowchart setting forth steps of an example process, as described herein.

Turning now to FIG. 5, a flowchart setting forth steps of a process 500, in accordance with aspects of the present disclosure, is illustrated. Steps of the process 500 may be carried out using any combination of suitable devices or systems, as well as using systems described in the present disclosure. In some embodiments, steps of the process 500 may be implemented as instructions stored in non-transitory computer readable media, as a program, firmware or software, and executed by a general-purpose, programmed or programmable computer, processer or other computing device. In other embodiments, steps of the process 500 may be hardwired in an application-specific computer, processer, or dedicated system or module as described with reference to FIGS. 1 to 4. Although the process 500 is illustrated and described as a sequence of steps, it is contemplated that the steps may be performed in any order or combination, and need not include all of the illustrated steps.

The process 500 may begin at process block 502 by providing an interior air device for an air intake system on a vehicle. As described, in some implementations, the interior air device may be connected or connectable to a conduit network of an air intake system, and may be operable to selectively allow air from an interior of the vehicle, like the space under the hood, into a vehicle engine. In some implementations, process block 502 may include providing guidance or instructions for installing, configuring and operating various components on the vehicle, including installing, configuring and operating the interior air device, and other steps.

A temperature of the exhaust gas may be determined at process block 504. For instance, in some implementations, a temperature of the exhaust gas may be determined by using sensors on the exhaust system, as described. In other implementations, chemical, particulate, or gas content of the exhaust gas may be determined using various sensors. Optionally, a report may also be generated and provided at process block 504. The report may be in any form, and provide various information. In some implementations, the report may be in the form of visual and/or audio signals, images, tabulated information and data, instructions, and combinations thereof. The report may be communicated to a user or operator by way of a display, HMI, speakers, or other means of output, or transmitted to various devices or systems for further steps, analysis or processing. The report may be generated and provided intermittently or continuously in substantially real-time. The report, or portions thereof, may also be electronically communicated (e.g. to a computer, server, mobile device, phone and so forth) and stored (e.g. in a memory, a computer, a database, a server, and so forth). In some implementations, the report may indicate various temperatures, like temperatures of the exhaust gas, or temperatures of various components of the vehicle exhaust system, for example.

At process block 506, temperature of the exhaust gas may then be controlled by operating the interior air device. For example, a temperature of the exhaust gas may be controlled by operating the interior air device. As described, the interior air device may be embodied and operated in a variety of ways. For example, an actuator arm may be controllably extended or retracted to control air flow into a conduit network of an air intake system. By controlling the extension of the actuator arm, air from an interior of the vehicle, like the space under the hood, may be controllably directed to (or prevented from entering) the engine, which in turn would control temperature of the exhaust gas.

According to one embodiment, an air intake system for a vehicle is provided. The system comprises an exterior air inlet that receives air from an exterior of the vehicle, an air outlet that supplies air to an engine of the vehicle, and a conduit network that connects the exterior air inlet and the air outlet. The system also comprises an interior air device that connects to the conduit network and is operable to selectively allow air from an interior of the vehicle into the engine. In one embodiment, the system further comprises an air filter connected to the conduit network. In one embodiment, the interior air device is connected to a conduit between the air filter and the exterior air inlet. In one embodiment, the interior air device comprises a base plate attachable to the conduit network, and a hatch that connects to the base plate and is operable to selectively allow air from the interior of the vehicle through an opening in the base plate. In one embodiment, the air intake system is connected to an air control module that operates, at least in part, the interior air device to selectively allow air from the interior of the vehicle into the conduit network. In one embodiment, the engine is connected to an exhaust system, and the air control module operates the interior air device to control at least a temperature of exhaust gas received by the exhaust system. In one embodiment, the interior of the vehicle is a space under a hood of the vehicle.

According to another embodiment, an interior air device for controlling exhaust on a vehicle is provided. The device comprises a base plate attachable to a conduit network of an air intake system of a vehicle, wherein the base plate comprises an opening in the base plate, and a hatch that connects to the base plate and is operable to selectively allow air from an interior of the vehicle through the opening. In one embodiment, the interior air device connects to a conduit between an air filter and an exterior air inlet of the air intake system. In one embodiment, the device further comprises an actuator arm that attaches to the base plate and the hatch. In one embodiment, the actuator arm attaches to a raised joint that extends from a first end of the base plate, and further attaches to at least one attachment panel that extends from the hatch. In one embodiment, the raised joint extends from a portion of the base plate that is angled away from a plane defined by the first end and a second end of the base plate. In one embodiment, the actuator arm further comprises a cylinder and a piston that are movably coupled to one another. In one embodiment, the cylinder further comprises an inlet port for receiving an air pressure that controls an extension of the actuator arm.

In one embodiment, an air intake system 110, 210, 310 is provided, which includes an exterior air inlet 350, 450 that receives air from an exterior of the vehicle 102, an air outlet 352 that supplies air to an engine 250 of the vehicle 102, and a conduit network 354 disposed on the vehicle 102 that connects the exterior air inlet 350, 450 and the air outlet 352. The system 110, 210, 310 also includes an interior air device 356, 456 that connects to the conduit network 354 and is operable to selectively allow air from an interior of the vehicle 102 into the engine 250.

In another embodiment, an interior air device 356, 456 is provided, which includes a base plate 480 attachable to a conduit network 354 of an air intake system 110, 210, 310 of a vehicle 102, wherein the base plate 480 comprises an opening in the base plate 480, and a hatch 482 that connects to the base plate 480 and is operable to selectively allow air from an interior of the vehicle 102 through the opening.

In yet another embodiment, a method is provided, which includes steps of providing an interior air device 356, 456 for an intake system on a vehicle 102, determining a temperature of an exhaust gas from an engine 250 on the vehicle 102, and controlling the temperature of the exhaust gas by operating the interior air device 356, 456 to selectively allow air from an interior of the vehicle 102 into the engine 250.

According to yet another embodiment, a method for controlling vehicle exhaust temperature is provided. The method comprises providing an interior air device 356, 456 for an air intake system 356, 456 on a vehicle 102, determining a temperature of an exhaust gas from an engine 250 on the vehicle 102, and controlling the temperature of the exhaust gas by operating the interior air device 356, 456 to selectively allow air from an interior of the vehicle 102 into the engine 250.

What is claimed is:

1. An air intake system for a vehicle, the air intake system comprising:
    an exterior air inlet disposed on the vehicle that receives air from an exterior of the vehicle;
    an air outlet disposed on the vehicle that supplies air to an engine of the vehicle;
    a conduit network disposed on the vehicle connecting the exterior air inlet and the air outlet;
    an interior air device disposed on the vehicle connected to the conduit network allowing air from an interior of the vehicle into the engine;
    a base plate attached to the conduit network;
    an opening disposed on the base plate;
    a hatch connected the base plate allowing air from the interior of the vehicle through the opening;
    an actuator arm attached to the base plate and the hatch;
    at least one attachment panel extending from the hatch wherein the actuator arm comprises a cylinder and a piston movably coupled together; and
    wherein the cylinder further comprises an inlet port for receiving air pressure that extends the piston.

* * * * *